United States Patent
Ohsawa

(10) Patent No.: US 12,391,252 B2
(45) Date of Patent: Aug. 19, 2025

(54) PLATOONING CONTROL APPARATUS

(71) Applicant: Daimler AG, Stuttgart (DE)

(72) Inventor: Fumihiko Ohsawa, Kanagawa (JP)

(73) Assignee: Daimler AG, Stuttgart (DE)

( * ) Notice: Subject to any disclaimer, the term of this patent is extended or adjusted under 35 U.S.C. 154(b) by 160 days.

(21) Appl. No.: 17/641,350

(22) PCT Filed: Jul. 30, 2020

(86) PCT No.: PCT/JP2020/029201
§ 371 (c)(1),
(2) Date: Mar. 8, 2022

(87) PCT Pub. No.: WO2021/049197
PCT Pub. Date: Mar. 18, 2021

(65) Prior Publication Data
US 2022/0340135 A1    Oct. 27, 2022

(30) Foreign Application Priority Data
Sep. 13, 2019    (JP) .................................. 2019-167198

(51) Int. Cl.
*B60W 30/165*    (2020.01)
*B60W 30/14*    (2006.01)
(Continued)

(52) U.S. Cl.
CPC ........ *B60W 30/165* (2013.01); *B60W 30/143* (2013.01); *B60W 40/076* (2013.01);
(Continued)

(58) Field of Classification Search
CPC ............. B60W 30/165; B60W 30/143; B60W 40/076; B60W 2300/145; B60W 2552/15;
(Continued)

(56) References Cited

U.S. PATENT DOCUMENTS

| 5,777,451 A | 7/1998 | Kobayashi et al. |
| 2002/0069010 A1 * | 6/2002 | Nishira ................. B60W 30/16 |
| | | 701/96 |

(Continued)

FOREIGN PATENT DOCUMENTS

| CN | 103153677 A | 6/2013 | |
| DE | 102015010559 A1 * | 3/2016 | ............ B60W 10/04 |

(Continued)

OTHER PUBLICATIONS

English Translation: Alam et al., DE 102015010559 A1, Mar. 2016, German Patent Office Patent Application Publication (Year: 2016).*

(Continued)

*Primary Examiner* — Navid Z. Mehdizadeh
*Assistant Examiner* — Oliver Tan
(74) *Attorney, Agent, or Firm* — Crowell & Moring LLP

(57) ABSTRACT

A platooning control apparatus that realizes platooning of a plurality of vehicles by causing an own vehicle to follow other vehicle. The platooning control apparatus includes a follow control unit that controls acceleration/deceleration of the own vehicle by using forward information of the own vehicle and other vehicle information obtained through vehicle-to-vehicle communication, a first acquisition unit that obtains first slope information indicating a gradient of a road surface on which a leading vehicle of the platooning is traveling, a determination unit that determines based on the first slope information whether or not to inhibit acceleration/deceleration control to be performed by the follow control unit when the leading vehicle is accelerating or decelerating, and a suppression control unit that inhibits the acceleration/deceleration control to be performed by the follow control unit when the acceleration/deceleration control is determined to be inhibited.

6 Claims, 4 Drawing Sheets

(51) Int. Cl.
*B60W 40/076* (2012.01)
*G05D 1/00* (2024.01)
*G08G 1/00* (2006.01)
*H04W 4/46* (2018.01)

(52) U.S. Cl.
CPC ......... *G05D 1/0293* (2013.01); *G05D 1/0295* (2013.01); *G08G 1/22* (2013.01); *H04W 4/46* (2018.02); *B60W 2300/145* (2013.01); *B60W 2552/15* (2020.02); *B60W 2556/65* (2020.02)

(58) Field of Classification Search
CPC ............ B60W 2556/65; G05D 1/0293; G05D 1/0295; G05D 2201/0213; G08G 1/22; H04W 4/46
See application file for complete search history.

(56) References Cited

U.S. PATENT DOCUMENTS

| | | | |
|---|---|---|---|
| 2005/0143895 A1 | 6/2005 | Kato | |
| 2013/0124064 A1 | 5/2013 | Nemoto | |
| 2016/0214609 A1 | 7/2016 | Yamaoka | |
| 2017/0349177 A1* | 12/2017 | Andersson | B60W 30/16 |
| 2018/0050697 A1* | 2/2018 | Kuszmaul | B60W 40/1005 |
| 2018/0222483 A1* | 8/2018 | Yoon | B60W 30/143 |
| 2018/0322791 A1* | 11/2018 | Brooks | B61L 15/0072 |
| 2018/0356835 A1 | 12/2018 | Gehring et al. | |
| 2019/0016336 A1 | 1/2019 | Niino et al. | |
| 2020/0324766 A1* | 10/2020 | Zhao | B60W 30/16 |

FOREIGN PATENT DOCUMENTS

| | | | | |
|---|---|---|---|---|
| DE | 102016003450 A1 * | 10/2016 | ............ | B60W 30/16 |
| JP | 2002-137652 A | 5/2002 | | |
| JP | 2010-176353 A | 8/2010 | | |
| JP | 2011-98604 A | 5/2011 | | |
| JP | 2012-25352 A | 2/2012 | | |
| JP | 2012-228963 A | 11/2012 | | |
| JP | 2013-159760 A | 8/2013 | | |
| JP | 2019-77409 A | 5/2019 | | |
| JP | 2020-177303 A | 10/2020 | | |
| WO | WO 2012/014041 A1 | 2/2012 | | |

OTHER PUBLICATIONS

English Translation: Flaerdh, DE 102016003450 A1, Oct. 2016, German Patent Office Patent Application Publication (Year: 2016).*
PCT/JP2020/029201, International Search Report dated Oct. 13, 2020 (Two (2) pages).
PCT/JP2020/029201, Japanese-language Written Opinion (PCT/ISA/237) dated Oct. 13, 2020 (Four (4) pages).
PCT/JP2020/029201, Written Opinion (PCT/IB/373 and PCT/ISA/237) dated Mar. 15, 2022 (Five (5) pages).
Japanese Office Action issued in Japanese application No. 2019-167198 dated Apr. 4, 2023, with partial English translation (Nine (9) pages).
English-language extended European Search Report issued in European Application No. 20863878.3-1213 dated Aug. 31, 2023 (7 pages).

* cited by examiner

FIG. 3

| Leading Vehicle | | Own Vehicle | Contents of Control |
|---|---|---|---|
| Uphill | Accelerating State | Downhill or Flat Road | Maintain Follow Control |
| | Decelerating State | | Inhibit Deceleration Control ...(1) |
| | Constant Speed State | | Maintain Follow Control |
| | Accelerating State | Uphill | Maintain Follow Control |
| | Decelerating State | | Inhibit Deceleration Control ...(1) |
| | Constant Speed State | | Maintain Follow Control |
| Downhill | Accelerating State | Downhill or Flat Road | Inhibit Acceleration Control ...(2) |
| | Decelerating State | | Maintain Follow Control |
| | Constant Speed State | | Maintain Follow Control |
| | Accelerating State | Uphill | Maintain Follow Control |
| | Decelerating State | | Inhibit Deceleration Control ...(3) |
| | Constant Speed State | | Maintain Follow Control |

PLATOONING CONTROL APPARATUS

FIELD

The present invention relates to a platooning control apparatus that controls an own vehicle so as to follow other vehicle in platooning.

BACKGROUND

For the purpose of reducing burdens of drivers' driving operations and improving fuel efficiency, a technique of the so-called platooning is known, which causes an own vehicle to follow other vehicle as a group of vehicles. In the platooning, a plurality of vehicles form a convoy, and each vehicle follows the preceding vehicle while maintaining the distance between the own vehicle and the preceding vehicle.

As follow control that causes the own vehicle to follow the preceding vehicle, for example, there is a known technique that adjusts acceleration/deceleration of the own vehicle based on the average speed of a group of preceding vehicles and the distance between the own vehicle and the preceding vehicle. According to this technique, it is possible to execute appropriate follow control in accordance with the situation of the preceding vehicles (see, for example, Patent Literature 1 below).

In recent years, development has been progressing in control (CACC; Cooperative Adaptive Cruise Control) that keeps an inter-vehicle distance at a predetermined distance by transmitting and receiving information between multiple vehicles through vehicle-to-vehicle communication. Since the CACC uses not only information obtained by in-vehicle radars but also information obtained by the vehicle-to-vehicle communication, as compared to conventional control (ACC; Adaptive Cruise Control) that does not use the vehicle-to-vehicle communication, it is said that the CACC can realize more precise control on the inter-vehicle distance. The CACC is also used in the technique of the platooning.

CITATION LIST

Patent Literature

Patent Literature 1: Japanese Laid-open Patent Publication No. 2011-98604

SUMMARY OF THE INVENTION

Problems to be Solved by the Invention

According to the follow control in the conventional platooning, for example, when a leading vehicle of the platooning decelerates or accelerates, the own vehicle also decelerates or accelerates in accordance with the leading vehicle.

However, in this follow control, for example, when the leading vehicle decelerates upon reaching an uphill, a situation will occur, in which the own vehicle decelerates by the follow control before reaching the uphill and then further decelerates upon reaching the uphill. In this case, unnecessary acceleration/deceleration control may be increased in the own vehicle, resulting in deterioration of fuel efficiency.

As described above, the conventional platooning has room for improvement in responsiveness of the follow control in the own vehicle when the leading vehicle travels uphill or downhill.

The platooning control apparatus of the present case has been devised in view of the above-mentioned problems, and an object thereof is to enhance responsiveness of follow control.

Means to Solve the Problem (1) A platooning control apparatus disclosed herein realizes platooning of a plurality of vehicles by causing an own vehicle to follow other vehicle, and includes: a follow control unit that controls acceleration/deceleration of the own vehicle by using forward information of the own vehicle and other vehicle information obtained through vehicle-to-vehicle communication; a first acquisition unit that obtains first slope information indicating a gradient of a road surface on which a leading vehicle of the platooning is traveling; a determination unit that determines based on the first slope information whether or not to inhibit acceleration/deceleration control to be performed by the follow control unit when the leading vehicle is accelerating or decelerating; and a suppression control unit that inhibits the acceleration/deceleration control to be performed by the follow control unit when the acceleration/deceleration control is determined to be inhibited.

(2) Preferably, the platooning control apparatus further includes a second acquisition unit that obtains second slope information indicating a gradient of a road surface on which the own vehicle is traveling, wherein the determination unit determines based on the first slope information and the second slope information whether or not to inhibit the acceleration/deceleration control to be performed by the follow control unit.

(3) Preferably, the first acquisition unit obtains the first slope information from the leading vehicle through the vehicle-to-vehicle communication.

(4) Preferably, the first acquisition unit obtains the first slope information calculated by the own vehicle.

(5) Preferably, the suppression control unit inhibits deceleration control to be performed by the follow control unit when the leading vehicle decelerates while traveling on an uphill.

(6) Preferably, the suppression control unit inhibits acceleration control to be performed by the follow control unit when the leading vehicle accelerates while traveling on a downhill and the own vehicle is traveling on a flat road or a downhill.

(7) Preferably, the suppression control unit inhibits deceleration control to be performed by the follow control unit when the leading vehicle decelerates while traveling on a downhill and the own vehicle is traveling on an uphill.

(8) Preferably, the suppression control unit performs control that inhibits deceleration control to be performed by the follow control unit when an inter-vehicle distance between the own vehicle and a preceding vehicle immediately ahead of the own vehicle is longer than a predetermined threshold.

As such, it is determined by using the first slope information whether or not to inhibit the acceleration/deceleration control to be performed by the follow control unit, and when it is determined to inhibit follow control, even if the leading vehicle accelerates or decelerates, the acceleration/deceleration control of the own vehicle is inhibited. Accordingly, unnecessary acceleration/deceleration control is inhibited, which enhances the responsiveness of the follow control. Therefore, fuel efficiency in the platooning can be enhanced.

BRIEF DESCRIPTION OF DRAWINGS

FIG. 3 is a table for explaining contents of control performed by the platooning control apparatus of FIG. 1.

EMBODIMENT(S) TO CARRY OUT THE INVENTION

The platooning control apparatus as an embodiment will now be described with reference to the drawings. The embodiment described below is merely illustrative, and there is no intention to exclude application of various modifications and/or techniques not specified in the following embodiment. Each configuration of the present embodiment can be variously modified and implemented without departing from the gist thereof. In addition, it can be selected as necessary, or can be combined as appropriate.

<1. Overall Configuration>

The platooning control apparatus according to the present embodiment carries out control (CACC; Cooperative Adaptive Cruise Control) that keeps an inter-vehicle distance at a predetermined distance by using vehicle-to-vehicle communication. Hereinafter, description will be made in relation to the platooning control apparatus applied to an own vehicle 1 depicted in FIG. 1. Platooning control apparatuses similar to that in the own vehicle 1 are applied also to other vehicles 2.

Figure 2A:
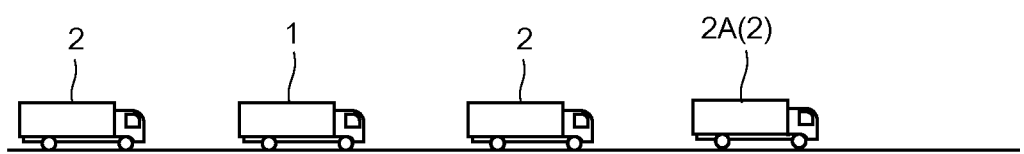
FIGS. 2A to 2C are schematic diagrams each explaining an example of platooning.

In the present embodiment, the own vehicle 1 forms a convoy together with each of other vehicles 2 and travels in a platoon. FIG. 2A is a schematic diagram explaining an example of platooning. The convoy is a row of multiple vehicles, and the platooning is a procession in which multiple vehicles 1 and 2 travel in a row on a road. The vehicle traveling at the forefront of the convoy is called the "leading vehicle" 2A.

The vehicles 1 and 2 are communicably connected to each other by using vehicle-to-vehicle communication. Each of the vehicles 1 and 2 except the leading vehicle 2A follows the vehicle (preceding vehicle) traveling ahead thereof by the CACC. Each of the vehicles 1 and 2 forming the convoy is assumed to know the vehicle ID of the leading vehicle 2A.

The present embodiment assumes that the own vehicle 1 is following a preceding vehicle (that is, the own vehicle 1 is a vehicle other than the leading vehicle).

The present embodiment illustrates trucks as the own vehicle 1 and other vehicles 2, but the types of the own vehicle 1 and other vehicles 2 are not particularly limited.

Figure 1:
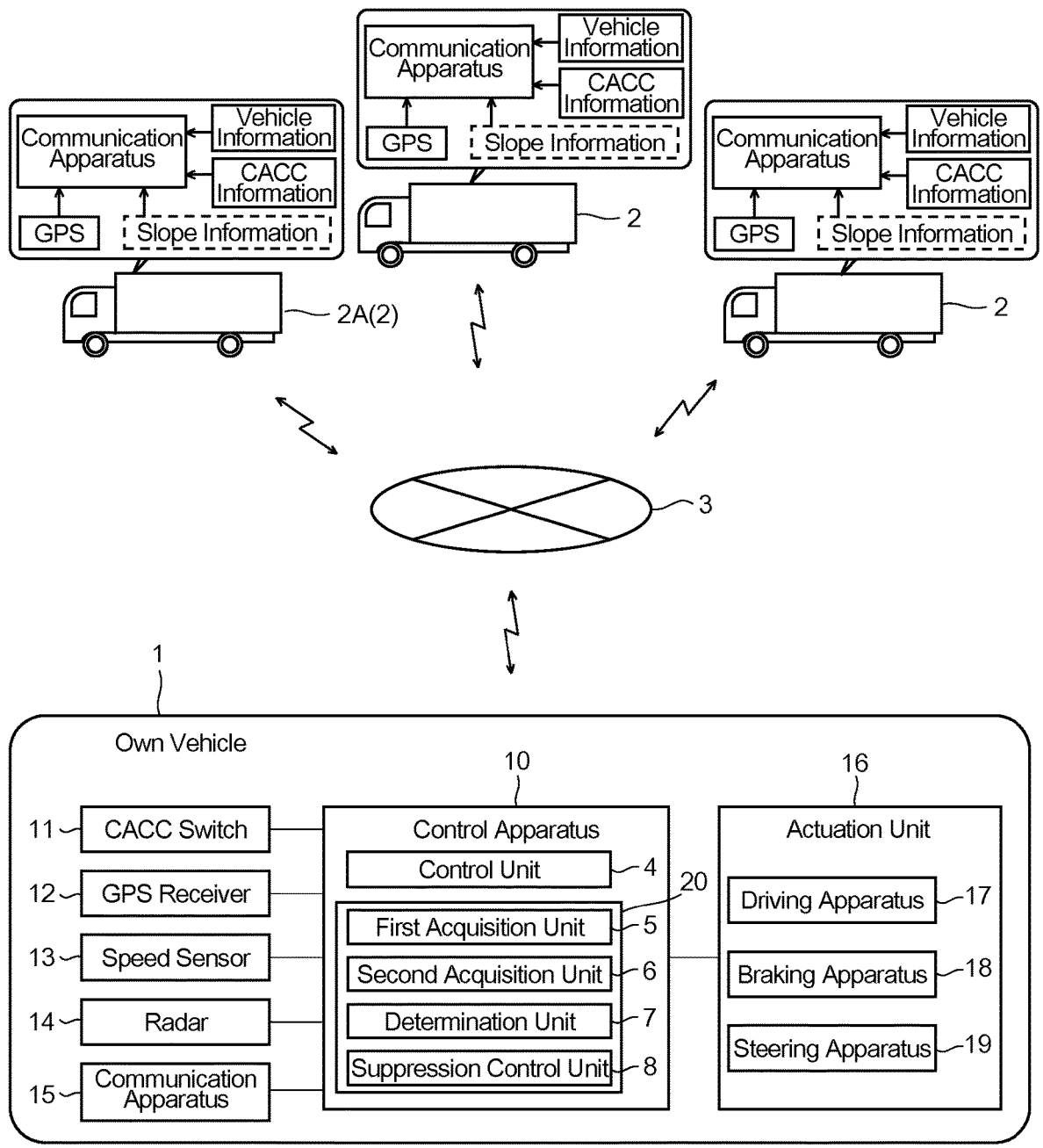
FIG. 1 is a block diagram depicting a vehicle including a platooning control apparatus as an embodiment together with a plurality of vehicles forming a convoy.

As illustrated in FIG. 1, the own vehicle 1 is provided with a CACC switch 11, a variety of sensors 12 and 13 that each obtain information about the own vehicle 1, a radar 14 and a vehicle-to-vehicle communication apparatus 15 (hereinafter, simply referred to as a "communication apparatus" as well) that each obtain information about other vehicles 2, an actuation unit 16 that operates (accelerates, stops, steers) the own vehicle 1, and a control apparatus 10 that controls the actuation unit 16.

The CACC switch 11 is an operating means for the occupant of the own vehicle 1 to select whether or not to carry out the CACC, is configured by a toggle switch in which either on or off is selected, and detects its own on and off states. When the CACC switch 11 is in the on state, the own vehicle 1 is put into a CACC mode in which the CACC is carried out. On the other hand, when the CACC switch 11 is in the off state, the own vehicle 1 is put into a normal mode in which the CACC is not carried out.

The GPS receiver 12 obtains position information regarding the current position of the own vehicle 1 by receiving GPS radio waves transmitted from non-illustrated GPS satellites. The speed sensor 13 detects a speed of the own vehicle 1. By differentiating the speed detected by the speed sensor 13 with respect to time, acceleration information of the own vehicle 1 can be obtained. The information detected or obtained by the CACC switch 11 and the variety of sensors 12 and 13 is transmitted to the control apparatus 10.

The radar 14 is, for example, a millimeter wave radar, and by transmitting an electromagnetic wave toward the front of the own vehicle 1 and receiving the reflected wave, obtains information (forward information) on the other vehicle 2 existing in front of the own vehicle 1 at a predetermined cycle. The information obtained by the radar 14 includes a distance (inter-vehicle distance) Dr to the other vehicle 2 existing in front of the own vehicle 1, the relative speed (speed difference) between the other vehicle 2 and the own vehicle 1, and the like.

The communication apparatus 15 is an electronic control apparatus that transmits and receives various information by communication (vehicle-to-vehicle communication) with other vehicles 2 via a wireless network 3. The communication apparatus 15 transmits the information transmitted from the control apparatus 10 to other vehicles 2 and also transmits the information received from other vehicles 2 to the control apparatus 10. The information (other vehicle information) received by the communication apparatus 15 from other vehicles 2 and 2A includes position information regarding the current positions of other vehicles 2 and 2A, speeds of other vehicles 2 and 2A, ID information of other vehicles 2 and 2A, acceleration information A2 on other vehicles 2 and 2A, CACC on/off information, IDs of communication target vehicles of the CACC, and the like.

The actuation unit 16 is configured by, specifically, a driving apparatus 17, a braking apparatus 18, and a steering apparatus 19. The driving apparatus 17 is a drive source (engine or electric motor), transmission mechanism, or the like of the own vehicle 1, and the braking apparatus 18 is a brake, a regenerative braking system, or the like which applies a braking force to the own vehicle 1. The steering apparatus 19 is a power steering device or the like which assists steering operation of the driver of the own vehicle 1. The operating states of the apparatuses 17 to 19 can be changed by manual operation and can also be controlled by the control apparatus 10.

The control apparatus 10 is an electronic control apparatus that integrally controls various devices mounted on the own vehicle 1, is configured as, for example, an LSI device or an embedded electronic device in which a microprocessor, ROM, RAM, etc. are integrated, and is connected to a communication line of an in-vehicle network. The control apparatus 10 of the present embodiment controls the actuation unit 16 based on the information detected or obtained by the CACC switch 11, the variety of sensors 12 and 13, the radar 14, and the communication apparatus 15.

Since the configuration of the platooning control apparatuses of other vehicles 2 and 2A is the same as that of the platooning control apparatus of the own vehicle 1, the illustration thereof is omitted.

In each of other vehicles 2 and 2A of FIG. 1, the communication apparatus 15 and various information (other vehicle information) transmitted by the vehicle-to-vehicle communication are illustrated. The other vehicle information transmitted from other vehicles 2 and 2A includes: vehicle information about traveling of other vehicles 2 and 2A, such as other vehicle speeds and acceleration information A2; position information (GPS) of other vehicles 2 and 2A; and information (CACC information) about the CACC, such as the CACC on/off information and IDs of the communication target vehicles. The acceleration information A2 on each of other vehicles 2 and 2A can be obtained by differentiating the speeds detected by the speed sensors 13 of other vehicles 2 and 2A with respect to time. Further, the position information of each of other vehicles 2 and 2A can be obtained from the GPS receivers 12 (not illustrated) of other vehicles 2 and 2A.

The own vehicle 1 also transmits vehicle information, the position information, and the CACC information via the wireless network 3.

<2. Control Configuration>

In the present embodiment, when the own vehicle 1 is in the CACC mode, the own vehicle 1 selects the other vehicle 2 traveling in front as a preceding vehicle serving as a follow target, and carries out the CACC so as to follow the selected preceding vehicle. Here, it is assumed that the own vehicle 1 and the preceding vehicle 2 specify each other's vehicle IDs by the IDs of the communication target vehicles included in the CACC information, and recognize each other as the communication target vehicles. Further, as described above, it is assumed that each of the vehicles 1 and 2 forming the convoy specifies the vehicle ID of the leading vehicle 2A of the convoy.

The control apparatus 10 is provided with a control unit (follow control unit) 4 as a functional element for carrying out the CACC. The control unit 4 has a function of controlling the actuation unit 16 so that the own vehicle 1 follows the other vehicle 2 (preceding vehicle) (this control is referred to as "follow control").

Specifically, the follow control of the control unit 4 controls acceleration/deceleration of the own vehicle 1 by controlling the actuation unit 16, using both the forward information of the own vehicle, which is obtained by the radar 14, and the other vehicle information obtained by the communication apparatus 15. This follow control is performed so that the inter-vehicle distance between the own vehicle 1 and the other vehicle 2 (preceding vehicle) is maintained at the predetermined distance. Here, the other vehicle information used in the follow control is the other vehicle speed and/or the acceleration information A2 of the other vehicle 2 (preceding vehicle). The acceleration/deceleration of the own vehicle 1 are adjusted by the follow control of the control unit 4, such that the inter-vehicle distance from the other vehicle 2 (preceding vehicle) is maintained at the predetermined distance. It should be noted that, in this description, the "acceleration/deceleration" means "acceleration or deceleration" and "acceleration/deceleration control" means "acceleration control or deceleration control".

Figure 2B:
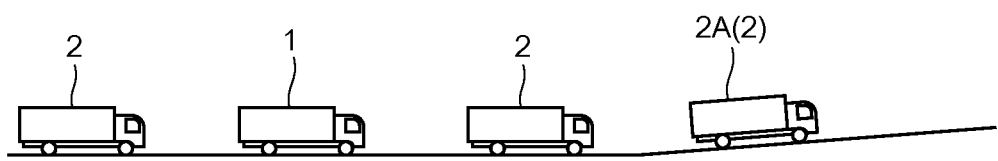

Incidentally, as illustrated in FIG. 2B, when the leading vehicle 2A decelerates upon reaching an uphill, continuation of the follow control of the control unit 4 has a risk of causing the own vehicle 1 to decelerate before the own vehicle 1 reaches the uphill due to the follow control and then to further decelerate when the own vehicle 1 reaches the uphill. Further in this case, the leading vehicle 2A often accelerates after decelerating upon reaching the uphill. This unfortunately induces frequent occurrence of unnecessary acceleration/deceleration control in the own vehicle 1.

Figure 2C:
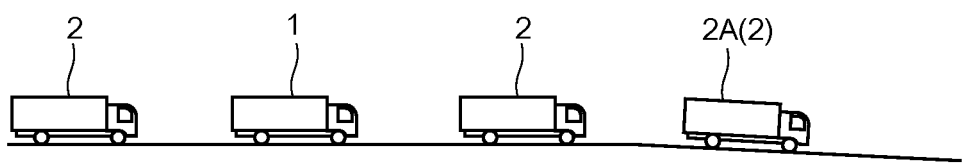

In addition, as illustrated in FIG. 2C, when the leading vehicle 2A accelerates upon reaching a downhill, the continuation of the follow control of the control unit 4 has a risk of causing the own vehicle 1 to accelerate before the own vehicle 1 reaches the downhill due to the follow control and then to further accelerate when the own vehicle 1 reaches the downhill. This case also has a risk of inducing frequent occurrence of unnecessary acceleration/deceleration control in the own vehicle 1.

In order to avoid such situations, the control apparatus 10 of the present embodiment is provided with an acceleration/deceleration suppressing function 20 for inhibiting the acceleration/deceleration control to be performed by the follow control of the control unit 4, by using slope information of the leading vehicle 2A.

In the acceleration/deceleration suppressing function 20, there are provided, as functional elements that carry out control (suppression control) for inhibiting the acceleration/deceleration control to be performed by the control unit 4 (follow control), a first acquisition unit 5, a second acquisition unit 6, a determination unit 7, and a suppression control unit 8.

By the follow control of the control unit 4 and the suppression control by each of the elements 5, 6, 7, and 8 in the acceleration/deceleration suppressing function 20, the control apparatus 10 functions as the platooning control apparatus of the present embodiment. This embodiment assumes that each of the elements 4, 5, 6, 7, and 8 in the control apparatus 10 is realized by software. Alternatively, the elements 4, 5, 6, 7, and 8 may be realized by hardware (electronic circuit) or by using software and hardware in combination.

The first acquisition unit 5 is provided to obtain first slope information G2 indicating a gradient of a road surface on which the leading vehicle 2A of the platooning is travelling. In the suppression control of the acceleration/deceleration suppressing function 20, when the acceleration or deceleration of the leading vehicle 2A changes due to the gradient, the subsequent acceleration/deceleration change is predicted and the acceleration/deceleration control by the follow control is temporarily inhibited. Because of this, the first slope information G2 is obtained by the first acquisition unit 5 to grasp the gradient of the road surface on which the leading vehicle 2A is traveling.

The second acquisition unit 6 is provided to obtain second slope information G1 indicating a gradient of a road surface on which the own vehicle 1 is traveling. Whether or not to implement the suppression control is determined in consideration of not only the gradient of the leading vehicle 2A (first slope information G2) but also the gradient of the own vehicle 1 (second slope information G1). Because of this, the second slope information G1 is obtained by the second acquisition unit 6 to grasp the gradient of the road surface on which the own vehicle 1 is traveling.

The first slope information G2 and the second slope information G1 (when they don't need to be distinguished from each other, simply referred to as "slope information") are information indicating the gradients of the road surfaces on which the vehicles 1 and 2A are traveling. The slope information is expressed as, for example, 0% for a flat road, is indicated by a positive value for an uphill with a predetermined positive gradient or higher, and is indicated by a negative value for a downhill with a predetermined negative gradient or lower.

The slope information can be calculated from, for example, the position information based on the GPS radio waves of target vehicles. The method for calculating the slope information based on the position information is, for example, as follows. The position information based on the GPS radio waves identifies the positions of vehicles by longitude x, latitude y, and altitude H.

First, a horizontal distance X between a position (longitude x1, latitude y1) of a vehicle at the moment and a position (longitude x2, latitude y2) of the vehicle Δt seconds ago is obtained by spherical trigonometry. The following "r" is the equatorial radius, which is assumed to be 637837 meters.

$$X=r*\cos-1[\sin(y1)*\sin(y2)+\cos(y1)*\cos(x2-x1)] \quad \text{Equation (1)}$$

Further, a height difference ΔH is obtained from the difference between an altitude H1 of the vehicle at the moment and an altitude H2 of the vehicle Δt seconds ago.

$$\Delta H = H2 - H1 \quad \text{Equation (2)}$$

The gradient of the road surface on which the vehicle is traveling is calculated by Equation (3) using the horizontal distance X and the height difference ΔH.

$$\text{Gradient (\%)} = \Delta H * 100/X \quad \text{Equation (3)}$$

Another example of the method for forming the slope information uses map information. In this case, by using the map information that has road information including latitude, longitude, and gradient, the slope information is calculated from the position information (latitude and longitude at the moment) based on the GPS radio waves of the target vehicle.

The first acquisition unit 5 may be configured to obtain the first slope information G2, for example, from the leading vehicle 2A by using the vehicle-to-vehicle communication via the communication apparatus 15. In this case, the leading vehicle 2A calculates the first slope information G2 based on its own position information and the calculated first slope information G2 is transmitted using the vehicle-to-vehicle communication via the communication apparatus 15 ("Slope Information" indicated by broken lines in FIG. 1). The first acquisition unit 5 of the own vehicle 1 receives the first slope information G2 from the leading vehicle 2A via the communication apparatus 15.

As another example, the own vehicle 1 may be configured to calculate the first slope information G2 based on the position information of the leading vehicle 2A and the first acquisition unit 5 may be configured to obtain the first slope information G2 calculated by the own vehicle 1. In this case, the position information of the leading vehicle 2A is transmitted using the vehicle-to-vehicle communication via the communication apparatus 15 ("GPS" in FIG. 1). The own vehicle 1 receives the position information of the leading vehicle 2A via the communication apparatus 15 and calculates the first slope information G2 based on the received position information.

The second acquisition unit 6 may be configured to calculate the second slope information G1 based on the position information of the own vehicle 1 and to obtain the calculated second slope information G1.

The determination unit 7 has a determination function of determining, upon obtaining information from the first acquisition unit 5 and the second acquisition unit 6 and when the leading vehicle 2A is accelerating or decelerating, based on the first slope information G2 and the second slope information G1 whether or not to inhibit the acceleration/deceleration control to be performed by the follow control of the control unit 4.

When the determination unit 7 determines to inhibit the acceleration/deceleration control, the suppression control unit 8 performs control (suppression control) that inhibits the acceleration/deceleration control to be performed by the follow control of the control unit 4. Here, the control that inhibits the acceleration/deceleration control means not to perform the acceleration control or the deceleration control, or to weaken the degree of the acceleration/deceleration.

By the determination unit 7 and the suppression control unit 8, when the acceleration or deceleration of the leading vehicle 2A changed due to the gradient, the acceleration/deceleration control to be performed by the follow control (control unit 4) is temporarily inhibited.

In detail, the determination unit 7 determines the following (I), (II), and (III).
- (I) Based on the acceleration information A2 of the leading vehicle 2A, it is determined whether the leading vehicle 2A is in an accelerating state, a decelerating state, or a constant speed state.
- (II) Based on the first slope information G2, it is determined whether the road surface on which the leading vehicle 2A is traveling is an uphill, a downhill, or a flat road.
- (III) Based on the second slope information G1, it is determined whether the road surface on which the own vehicle 1 is traveling is an uphill, a downhill, or a flat road.

The acceleration information A2 of the leading vehicle 2A can be obtained from the leading vehicle 2A by using the vehicle-to-vehicle communication via the communication apparatus 15. The acceleration information A2 is information indicating the acceleration or deceleration of the leading vehicle 2A, and indicates the acceleration with a positive value and the deceleration with a negative value.

When the acceleration information A2 is smaller than a predetermined acceleration threshold a1, the determination unit 7 determines that the leading vehicle 2A is in the decelerating state. The threshold a1 is set as a predetermined deceleration at which the leading vehicle 2A can be determined to be in the decelerating state.

When the acceleration information A2 is larger than a predetermined acceleration threshold a2, the determination unit 7 determines that the leading vehicle 2A is in the accelerating state. The threshold a2 is set as a predetermined acceleration at which the leading vehicle 2A can be determined to be in the decelerating state.

When neither of the above applies, the determination unit 7 determines that the leading vehicle 2A is in the constant speed state.

The determination unit 7 determines that the leading vehicle 2A is traveling on an uphill when the first slope information G2 is a positive value, and determines that the leading vehicle 2A is traveling on a downhill when the first slope information G2 is a negative value. Further, when the first slope information G2 is 0, the determination unit 7 determines that the leading vehicle 2A is traveling on a flat road.

In addition, the determination unit 7 determines that the own vehicle 1 is traveling on an uphill when the second slope information G1 is a positive value, and determines that the own vehicle 1 is traveling on a downhill when the second slope information G1 is a negative value. Further, when the second slope information G1 is 0, the determination unit 7 determines that the own vehicle 1 is traveling on a flat road.

Then, the determination unit 7 determines, in accordance with combinations of the determination results of the above (I), (II), and (III), whether or not to inhibit the acceleration/deceleration control to be performed by the follow control of the control unit 4. The suppression control unit 8 performs the suppression control when the determination unit 7 determines to inhibit the acceleration/deceleration control. When the determination unit 7 determines not to inhibit the acceleration/deceleration control, the follow control of the control unit 4 is continued (maintained).

FIG. 3 is a table illustrating an example of contents of control according to the combinations of the determination results of the above (I), (II), and (III).

The following (1) to (3) are listed as the main points in the example of contents of control illustrated by the table.

(1) When the leading vehicle 2A is in the decelerating state while traveling on an uphill, regardless of whether the own vehicle 1 is traveling on an uphill, a downhill, or a flat road, the deceleration control by the follow control of the control unit 4 is inhibited.

When the leading vehicle 2A decelerates upon reaching the uphill, the leading vehicle 2A is predicted to accelerate thereafter. Because of this, in the own vehicle 1, the deceleration control by the follow control of the control unit 4 is temporarily inhibited.

(2) When the leading vehicle 2A is in the accelerating state while traveling on a downhill, and the own vehicle 1 is traveling on a downhill or a flat road, the acceleration control by the follow control of the control unit 4 is inhibited.

When the leading vehicle 2A accelerates upon reaching the downhill, the leading vehicle 2A is predicted to decelerate thereafter. Because of this, when the own vehicle 1 is traveling on a downhill or a flat road, the acceleration control by the follow control of the control unit 4 is temporarily inhibited.

(3) When the leading vehicle 2A is in the decelerating state while traveling on a downhill, and the own vehicle 1 is traveling on an uphill, the deceleration control by the follow control of the control unit 4 is inhibited.

Even when the leading vehicle 2A is decelerating on the downhill, because the own vehicle 1 is traveling on the uphill, in order to secure the climbing ability, the deceleration control for the follow control is temporarily inhibited.

If none of the above (1) to (3) applies, the determination unit 7 determines not to inhibit the acceleration/deceleration control. In this case, the follow control of the control unit 4 is continued (maintained). As a result, in accordance with the accelerating/decelerating state of the leading vehicle 2A, the acceleration/deceleration of the own vehicle 1 is adjusted.

The inhibition of the deceleration control by the suppression control unit 8 sometimes shortens the inter-vehicle distance Dr between the own vehicle 1 and the preceding vehicle 2 immediately ahead.

In view of this, the suppression control unit 8 inhibits the deceleration control only when the inter-vehicle distance Dr between the own vehicle 1 and the preceding vehicle 2 immediately ahead is larger than a predetermined inter-vehicle distance Dth (predetermined threshold), and when the inter-vehicle distance Dr is equal to or shorter than the predetermined inter-vehicle distance Dth, the deceleration control is not inhibited so as to maintain the follow control of the control unit 4. As a result, the inter-vehicle distance Dr between the own vehicle 1 and the preceding vehicle 2 immediately ahead is inhibited from being excessively shortened. The predetermined inter-vehicle distance Dth is set as a distance value in which the inter-vehicle distance between the own vehicle 1 and the preceding vehicle 2 immediately ahead is not excessively shortened even when the deceleration control is inhibited.

<3. Flowchart>

Figure 4:
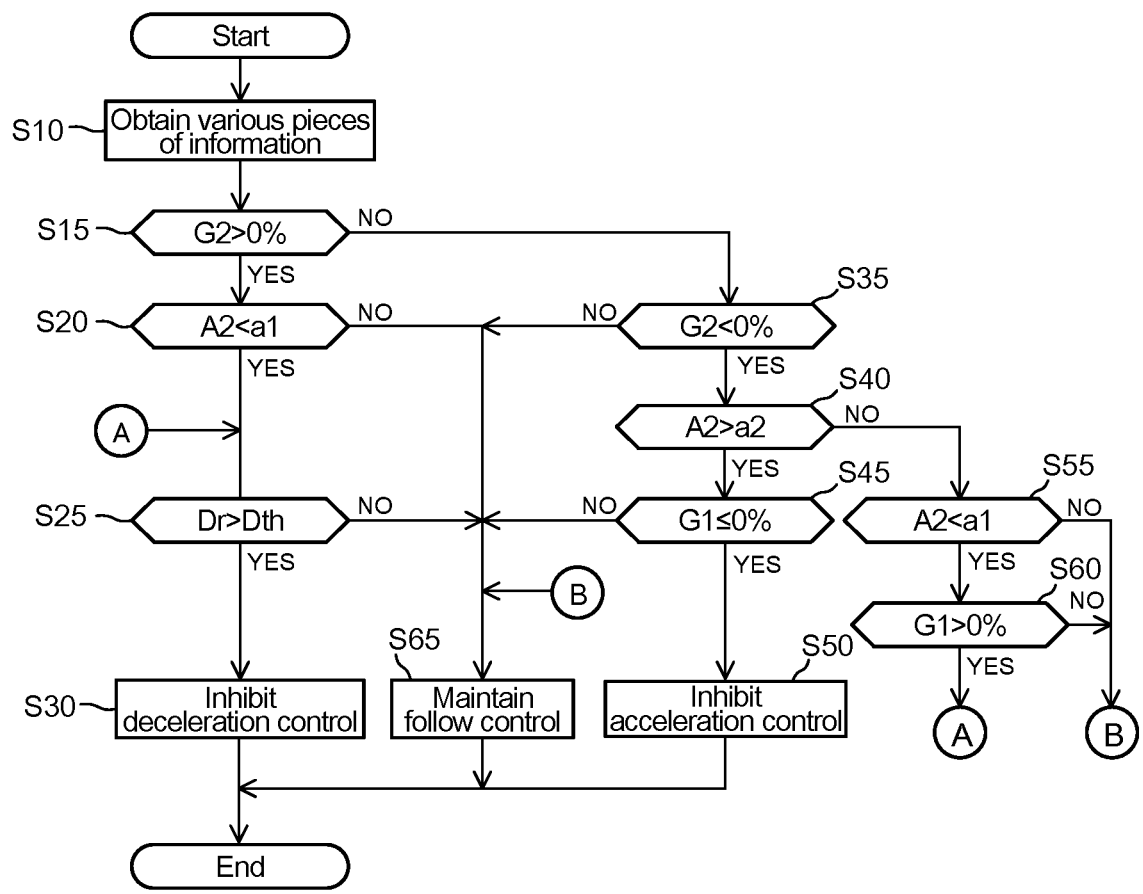
FIG. 4 is a flowchart illustrating the contents of control performed by the platooning control apparatus of FIG. 1.

FIG. 4 is a flowchart illustrating the above-mentioned contents of control. In the flow of FIG. 4, parts A are assumed to be connected to each other and parts B are assumed to be connected to each other. This flow is repeated in the control apparatus 10 at a predetermined calculation cycle when the own vehicle 1 is in the CACC mode. Whether or not the own vehicle 1 is in the CACC mode is determined by, for example, the determination unit 7 based on the information transmitted from the CACC switch 11 to the control apparatus 10.

In Step S10, various pieces of information are obtained. The various pieces of information include the first slope information G2 of the leading vehicle 2A, the second slope information G1 of the own vehicle 1, and the acceleration information A2 of the leading vehicle 2A.

In Step S15, it is determined whether or not the first slope information G2 of the leading vehicle 2A is larger than 0. When G2>0, that is, when it is determined that the leading vehicle 2A is traveling on an uphill (YES in Step S15), in Step S20, by comparing the acceleration information A2 of the leading vehicle 2A with the predetermined acceleration threshold a1, it is determined whether or not the vehicle 2A is in the decelerating state.

When A2<a1, that is, when the leading vehicle 2A is in the decelerating state (YES in Step S20), in Step S25, it is determined whether or not the inter-vehicle distance Dr is larger than the predetermined inter-vehicle distance Dth. When the inter-vehicle distance Dr is larger than the predetermined inter-vehicle distance Dth (YES in Step S25), in Step S30, the deceleration control by the follow control (control unit 4) is inhibited by the suppression control unit 8.

The above processes are executed in the case of (1) of FIG. 3.

On the other hand, when the first slope information G2 of the leading vehicle 2A is 0 or less (NO in Step S15), in Step S35, it is determined whether or not the first slope information G2 is smaller than 0. When G2<0, that is, when it is determined that the leading vehicle 2A is traveling on a downhill (YES in Step S35), in Step S40, the acceleration information A2 of the leading vehicle 2A is compared with the predetermined acceleration threshold a2 to determine whether or not the leading vehicle 2A is in the accelerating state.

When A2>a2, that is, when the leading vehicle 2A is in the accelerating state (YES in Step S40), in Step S45, it is determined whether or not the second slope information G1 of the own vehicle 1 is 0 or less. When G1≤0, that is, when it is determined that the own vehicle 1 is traveling on a downhill or a flat road (YES in Step S45), in Step S50, the acceleration control by the follow control (control unit 4) is inhibited by the suppression control unit 8.

The above processes are executed in the case of (2) of FIG. 3.

When the leading vehicle 2A is traveling on a downhill (YES in Step S35) and in the decelerating state (NO in Step S40 and YES in Step S55), and the own vehicle 1 is traveling on an uphill (YES in Step S60), under a circumstance where the inter-vehicle distance Dr is larger than the predetermined inter-vehicle distance Dth (YES in Step S25), the deceleration control by the follow control (control unit 4) is inhibited by the suppression control unit 8 (Step S30).

The above processes are executed in the case of (3) of FIG. 3.

In cases other than the above, specifically, in the following cases (a) to (f), the follow control (control unit 4) is maintained in Step S65.

(a) When the leading vehicle 2A is traveling on an uphill (YES in Step S15) and in the constant speed state (NO in Step S20) or is traveling on a downhill (YES in Step S35) and in the constant speed state (NO in Step S55).

(b) When the leading vehicle 2A is traveling on an uphill (YES in Step S15) and in the accelerating state (NO in Step S20).

(c) When the leading vehicle 2A is traveling on a downhill (YES in Step S35) and in the decelerating state (NO in Step S40 and YES in Step S55), and the own vehicle 1 is traveling on a downhill or a flat road (NO in Step S60).

(d) When the leading vehicle 2A is traveling on a downhill (YES in Step S35) and in the accelerating state (YES in Step S40), and the own vehicle 1 is traveling on an uphill (NO in Step S45).

(e) When the leading vehicle 2A is traveling on a flat road (NO in Step S15 and NO in Step S35).

(f) Further, in the case of (1) or (2) of FIG. 3 (YES in Step S20 or YES in Step S60), when the inter-vehicle distance Dr is equal to or shorter than the predetermined inter-vehicle distance Dth (NO in Step S25).

<4. Actions and Effects>

According to the above-described embodiment, the determination unit 7 determines based on the first slope information G2 and the second slope information G1 whether or not to inhibit the acceleration/deceleration control to be performed by the follow control of the control unit 4, and when it is determined to inhibit the acceleration/deceleration control, even if the leading vehicle 2A accelerates or decelerates, the acceleration/deceleration control of the own vehicle 1 is inhibited by the suppression control unit 8. Accordingly, unnecessary acceleration/deceleration control is inhibited, which enhances the responsiveness of the follow control. Therefore, fuel efficiency in the platooning can be enhanced.

In addition, since the determination unit 7 makes a determination based on the first slope information G2 and the second slope information G1, the accuracy of the determination is elevated.

For example, when the leading vehicle 2A has reached an uphill, instead of performing the suppression control of the present embodiment, performing the deceleration control by the follow control in each of succeeding vehicles would lead to accumulation of the deceleration control in each of the succeeding vehicles, which has a risk of causing delay in traveling of the vehicles at the back of the convoy. In this respect, if the present embodiment inhibits the delay control, the occurrence of the delay can be avoided or suppressed.

If the first acquisition unit 5 obtains the first slope information G2 calculated by the leading vehicle 2A, it is possible to obtain accurate first slope information G2 of a road surface on which the leading vehicle 2A is travelling.

If the first acquisition unit 5 obtains the first slope information G2 calculated by the own vehicle 1, the first slope information G2 of the leading vehicle 2A can be obtained without being affected by communication conditions.

When the leading vehicle 2A decelerates while traveling on an uphill, the suppression control unit 8 inhibits the deceleration control to be performed by the follow control of the control unit 4, so that unnecessary deceleration control when the leading vehicle 2A travels uphill is inhibited.

When the leading vehicle 2A accelerates while traveling on a downhill and the own vehicle 1 is traveling on a flat road or a downhill, the suppression control unit 8 inhibits the acceleration control to be performed by the follow control of the control unit 4, so that unnecessary acceleration control when the leading vehicle 2A travels downhill is inhibited.

When the leading vehicle 2A decelerates while traveling on a downhill and the own vehicle 1 is traveling on an uphill, the suppression control unit 8 inhibits the deceleration control to be performed by the follow control of the control unit 4, so that unnecessary deceleration control when the vehicle 2A travels downhill is inhibited.

When the inter-vehicle distance Dr between the own vehicle 1 and the preceding vehicle 2 immediately ahead of the own vehicle 1 is larger than the predetermined threshold Dth, the suppression control unit 8 performs the control that inhibits the deceleration control to be performed by the follow control of the control unit 4, so that the deceleration control is inhibited only when the inter-vehicle distance is sufficiently large, which inhibits the inter-vehicle distance from becoming excessively short even if the deceleration control is inhibited.

<5. Miscellaneous>

Regardless of the above-mentioned embodiment, various modifications can be implemented without departing from the gist thereof. Each configuration of the present embodiment can be selected as necessary, or may be combined as appropriate.

For example, the contents of control of FIG. 3 described above are exemplary, and are not limited thereto. For example, although the given example performs the suppression control in each of a case where the leading vehicle 2A is traveling uphill and a case where the leading vehicle 2A is traveling downhill, the suppression control may be performed in only one of those cases.

All determination conditions in the determination unit 7 are examples. The above-described embodiment illustrates the configuration in which the determination is made using the first slope information G2 and the second slope information G1, but the determination unit 7 may make the determination using only the first slope information G2.

The illustrated configuration compares the inter-vehicle distance Dr with the predetermined inter-vehicle distance Dth before inhibiting the deceleration control and inhibits the deceleration control when the inter-vehicle distance Dr is larger than the predetermined inter-vehicle distance Dth, but an alternative configuration may inhibit the deceleration control without comparing the inter-vehicle distance Dr with the predetermined inter-vehicle distance Dth.

Another alternative configuration may compare the inter-vehicle distance Dr with the predetermined inter-vehicle distance Dth before inhibiting the acceleration control, and may omit inhibition of adjustment control when the inter-vehicle distance Dr is larger than the predetermined inter-vehicle distance Dth. In this case, it is possible to suppress a situation in which the inter-vehicle distance Dr becomes excessively large due to the inhibition of the adjustment control.

The above-described embodiment illustrates an example where the leading vehicle 2A is defined as the vehicle that actually locates at the forefront of the convoy, but the vehicle regarded as the leading vehicle 2A by the own vehicle 1 may be other than the vehicle that actually locates at the forefront of the convoy. For example, when the convoy extends long with a number of vehicles and the own vehicle 1 locates at the back of the convoy, the distance from the own vehicle 1 to the vehicle that locates at the forefront of the convoy becomes long. In such a case, the "leading vehicle 2A" may be defined as a vehicle that locates several vehicles ahead of the own vehicle 1.

Although FIGS. 1, 2A, 2B, and 2C each exemplify a case where four vehicles perform the platooning, the number of vehicles is not particularly limited.

REFERENCE SIGNS LIST 1 own vehicle
2 other vehicle
2A leading vehicle
3 wireless network
4 control unit (follow control unit)
5 first acquisition unit
6 second acquisition unit
7 determination unit
8 suppression control unit
10 control apparatus
11 CACC switch
12 GPS receiver
13 speed sensor
14 radar
15 communication apparatus
16 actuation unit
17 driving apparatus
18 braking apparatus
19 steering apparatus
20 acceleration/deceleration suppressing function

What is claimed is:

1. A platooning control apparatus that realizes platooning of a plurality of vehicles by causing an own vehicle to follow an other vehicle, the platooning control apparatus, comprising:
    a follow control unit that controls an acceleration or deceleration of the own vehicle by using forward information of the own vehicle and other vehicle information obtained through vehicle-to-vehicle communication;
    a first acquisition unit that obtains first slope information indicating a gradient of a road surface on which a leading vehicle of the platoon is traveling;
    a second acquisition unit that obtains second slope information indicating a gradient of a road surface on which the own vehicle is traveling;
    a determination unit that determines, as a first determination, whether the leading vehicle is in an accelerating state or a decelerating state based on an acceleration information of the leading vehicle, and, as a second determination, whether the leading vehicle is travelling uphill or downhill, based on the first slope information, and, as a third determination, whether the own vehicle is travelling uphill or downhill based on the second slope information, and further determines whether or not to inhibit the acceleration control or the deceleration control to be performed by the follow control unit in accordance with a combination of determination results of the first determination, the second determination and the third determination; and
    a suppression control unit that inhibits the acceleration control or the deceleration control to be performed by follow control unit when the acceleration control or the deceleration control is determined to be inhibited,
    wherein the suppression control unit inhibits the deceleration control to be performed by the follow control unit when the determination unit determines, based on the combinations of determination results, that the leading vehicle is in the decelerating state and is travelling downhill by the first determination and the second determination, and the own vehicle is travelling uphill by the third determination.

2. The platooning control apparatus of claim 1, wherein the first acquisition unit obtains the first slope information from the leading vehicle through vehicle-to-vehicle communication.

3. The platooning control apparatus of claim 1, wherein the first acquisition unit obtains the first slope information calculated by the own vehicle.

4. The platooning control apparatus of claim 1, wherein the suppression control unit inhibits the deceleration control to be performed by the follow control unit in when the determination unit determines that the leading vehicle is in the decelerating state and is traveling uphill by the first determination and the second determination.

5. The platooning control apparatus of claim 1,
    wherein the determination unit determines whether the own vehicle is traveling uphill, downhill, or level as the third determination, and
    wherein the suppression control unit inhibits the acceleration control to be performed by the follow control unit when the determination unit determines that the leading vehicle is in the accelerating state and is traveling downhill by the first determination and the second determination, and the own vehicle is traveling level or downhill by the third determination.

6. The platooning control apparatus of claim 1, wherein the suppression control unit performs control that inhibits the deceleration control to be performed by the follow control unit when the inter-vehicle distance between the own vehicle and a preceding vehicle immediately ahead of the own vehicle is longer than a predetermined threshold.

* * * * *